United States Patent
Colbeau-Justin et al.

(10) Patent No.: US 11,702,345 B2
(45) Date of Patent: Jul. 18, 2023

(54) SILICA SUSPENSIONS

(71) Applicant: RHODIA OPERATIONS, Aubervilliers (FR)

(72) Inventors: Frédéric Colbeau-Justin, Othis (FR); Marc-David Braida, Bry-sur-Marne (FR); Mathilde Mignard, Bezons (FR)

(73) Assignee: RHODIA OPERATIONS, Lyons (FR)

( * ) Notice: Subject to any disclaimer, the term of this patent is extended or adjusted under 35 U.S.C. 154(b) by 171 days.

(21) Appl. No.: 16/772,149

(22) PCT Filed: Dec. 20, 2018

(86) PCT No.: PCT/EP2018/086052
§ 371 (c)(1),
(2) Date: Jun. 11, 2020

(87) PCT Pub. No.: WO2019/129605
PCT Pub. Date: Jul. 4, 2019

(65) Prior Publication Data
US 2021/0070618 A1    Mar. 11, 2021

(30) Foreign Application Priority Data

Dec. 27, 2017    (EP) .................... 17306943

(51) Int. Cl.
*C01B 33/12*    (2006.01)
*C08K 5/19*    (2006.01)
*B82Y 40/00*    (2011.01)

(52) U.S. Cl.
CPC ............... *C01B 33/12* (2013.01); *C08K 5/19* (2013.01); *B82Y 40/00* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| | | |
|---|---|---|
| 5,547,502 A | 8/1996 | Chevallier |
| 5,925,708 A | 7/1999 | Esch et al. |
| 6,180,076 B1 | 1/2001 | Uhrlandt et al. |
| 6,214,912 B1 | 4/2001 | Chevallier |
| 6,221,149 B1 | 4/2001 | Bomal et al. |
| 6,268,424 B1 | 7/2001 | Blume et al. |
| 6,290,924 B1 | 9/2001 | Chevallier |
| 6,335,396 B1 | 1/2002 | Chevallier |
| 6,468,493 B1 | 10/2002 | Chevallier et al. |
| 6,702,888 B2 | 3/2004 | Bomal et al. |
| 9,334,169 B2 | 5/2016 | Guy et al. |
| 9,359,215 B2 | 6/2016 | Allain et al. |
| 2003/0035888 A1* | 2/2003 | Eriyama ............... C08K 9/06 427/212 |
| 2003/0134943 A1* | 7/2003 | Labarre .................. C08J 3/215 524/492 |
| 2004/0062701 A1 | 4/2004 | Valero et al. |
| 2011/0263784 A1 | 10/2011 | Valero et al. |
| 2012/0142845 A1* | 6/2012 | De Winter ............ C09C 1/3081 106/491 |

FOREIGN PATENT DOCUMENTS

| | | |
|---|---|---|
| EP | 396450 A | 11/1990 |
| EP | 520862 A | 12/1992 |
| EP | 647591 A | 4/1995 |
| EP | 0900829 A | 3/1999 |
| EP | 901986 A | 3/1999 |
| EP | 983966 A | 3/2000 |
| JP | 2001213617 A | 8/2001 |
| WO | 199509127 A1 | 4/1995 |
| WO | 199509128 A1 | 4/1995 |
| WO | 199630303 A1 | 10/1996 |
| WO | 199630304 A1 | 10/1996 |
| WO | 199854090 A1 | 12/1998 |
| WO | 200153386 A1 | 7/2001 |
| WO | 01/55030 A2 | 8/2001 |
| WO | 2002053497 A1 | 7/2002 |
| WO | 2003016215 A1 | 2/2003 |
| WO | 2009112458 A1 | 9/2009 |
| WO | 2011117400 A1 | 9/2011 |

OTHER PUBLICATIONS

Kasseh et al ("Surfactant-Mediated Transfer of Colloidal Silica Particles from Water into an Immiscible Weakly Polar Solvent", J Colloid and Interface Sci., 208, (1998), pp. 162-166). (Year: 1998).*
Heng-Lei Su Jung-Mu Hsu Jing-Pin Pan Chorng-Shyan Chern Journal of Applied Polymer Science,vol. 183, No. 6, | January 2886 (2886-81-81), pp. 3688-3608, XP055487013, ISSN: 8021-8995, DOI: 18. 1082/app.25313.
Hua Zou†Shishan Wu*†Jian Shen*†‡Chem. Rev. 2008, 108, 9, 3893-3957 Publication Date:Aug. 23, 2008 https://doi.org/10.1021/cr068035q.

* cited by examiner

*Primary Examiner* — Colin W. Slifka
*Assistant Examiner* — Michael Forrest
(74) *Attorney, Agent, or Firm* — Osha Bergman Watanabe & Burton LLP

(57) ABSTRACT

Stable suspensions of silica particles in water-immiscible polar organic liquids are provided.

10 Claims, No Drawings

SILICA SUSPENSIONS

This application claims priority from European application No. EP 17306943.6 filed on 27 Dec. 2017, the whole content of this application being incorporated herein by reference for all purposes.

TECHNICAL FIELD

The present invention relates to stable suspensions of silica particles in polar organic liquids and to a method for their preparation.

BACKGROUND ART

A problem often encountered with the use of silica particles in organic matrices, such as polymers, is the difficulty of dispersing and intimately mixing the inorganic particles with the organic matrix. Silica particles have in fact the tendency to form agglomerates that are difficult to disperse in any given polymeric matrix. It would thus be advantageous to have suspensions of silica particles which could be mixed with liquid systems comprising polymers and/or oligomers, suspended and/or in solution, to allow intimate dispersion of the inorganic particles in the organic matrix. However, to be compatible, said silica particles suspensions should be provided in organic liquids and they should have sufficient kinetic stability that settling of the silica particles does not take place.

Methods to prepare suspensions of silica particles in organic liquids are known. For instance WO01/53386 discloses a process for the preparation of a dispersion of mineral particles, in particular silica particles, in an organic solvent wherein: a) a water-immiscible organic solvent and a transfer agent, which is partially or preferably completely soluble in the said organic solvent, are mixed with an aqueous dispersion or suspension of mineral particles, and b) the organic solvent containing the said mineral particles is separated from the aqueous phase. It has now been found that silica suspensions thus obtained are not stable for long periods of time and settling of the silica particles takes place.

SUMMARY OF INVENTION

It is an object of the invention to provide stable suspensions of silica particles having an average particle size of less than 400 nm in polar water-immiscible organic liquids.

A further object of the invention is a process for the preparation of said stable suspensions starting from precipitated silica in solid form.

DESCRIPTION OF INVENTION

A first object of the invention is a suspension of silica particles comprising:
a water-immiscible polar organic liquid,
at least one phase transfer agent, and
silica particles having an average particle size of less than 400 nm, characterised in that organosilane moieties deriving from compounds of formula (I):

$$R-Si(OR^1)_3 \quad (I),$$

wherein R is —$CH_3$ or —$CH=CH_2$ and each $R^1$ is independently selected from the group consisting of —$CH_3$ or —$C_2H_5$,
are chemically bound to the silica particles.

The term "suspension" is used herein to refer to a liquid in which solid particles are dispersed, according to IUPAC definition.

It has been found that the presence of the organosilane moieties deriving from compounds of formula (I) greatly improves the stability of the suspension of silica particles in the water-immiscible polar organic liquid.

Notable examples of compounds of formula (I) effective in stabilising the suspension of silica particles are $CH_3Si(OCH_3)_3$, $CH_2=CHSi(OCH_3)_3$, and $CH_3Si(OC_2H_5)_3$.

The organosilane moieties are present in an amount of at least 1% by weight with respect to the weight of the silica particles. The organosilane moieties are present in an amount which does not typically exceed 100% by weight with respect to the weight of the silica particles. The organosilane moieties are typically present in an amount from 2 to 45% by weight with respect to the weight of the silica particles. In some embodiments the organosilane moieties are typically present in an amount from 2 to 35% by weight, even 2 to 20% by weight.

The silica particles in the suspension of the invention typically have an average particle size of less than 400 nm, even less than 350 nm, preferably less than 300 nm. The average particle size is typically at least 5 nm. The average silica particle size may advantageously be in the range from 10 to 350 nm, preferably in the range from 20 to 300 nm, more preferably in the range from 20 to 250 nm. The average silica particle size may even be in the range from 20 to 200 nm. In the present specification the expression "average particle size" is used to refer to the median ($D_{50}$) of the number particle size distribution as measured by dynamic light scattering.

The amount of silica particles in the suspension is in the range from 1 to 50% by weight, typically from 2 to 40% by weight, preferably from 3 to 30% by weight. The silica content is more preferably in the range from 5 to 25% by weight with respect to the total weight of the suspension.

The expression "phase transfer agent" is used herein to identify a compound which is capable of facilitating the transfer of silica particles from water or an aqueous phase to a polar organic liquid.

The phase transfer agent is normally a surfactant, especially an ionic or nonionic surfactant, preferably comprising at least two hydrophobic chains.

Among nonionic surfactants mention may be made of:
polyoxyalkylated (especially polyoxyethylated, polyoxypropylated or polyoxybutylated) alkylphenoxides, the alkyl substituent of which is $C_6$-$C_{12}$, containing between 5 and 25 alkylene units;
polyoxyalkylated $C_8$-$C_{22}$ aliphatic alcohols containing between 1 and 25 oxyalkylene (especially oxyethylene and oxypropylene) units;
the products resulting from the condensation of ethylene oxide and the compound resulting from the condensation of propylene oxide with propylene glycol;
the products resulting from the condensation of ethylene oxide and the compound resulting from the condensation of propylene oxide with ethylenediamine;
polysiloxanes carrying polyether functional groups;
amides of $C_8$-$C_{20}$ fatty acids;
ethoxylated fatty acids amides.

In an advantageous embodiment, the phase transfer agent is an ionic surfactant, preferably a cationic surfactant.

Advantageously the phase transfer agent is a quaternary ammonium salt. Notable non-limiting examples of quaternary ammonium salts are for instance those of formula (1):

$$R^2R^3R^4R^5NX \quad (1)$$

wherein: X is selected from the group consisting of halogens, $CH_3SO_4^-$ and $C_2H_5SO_4^-$; $R^2$ and $R^3$, equal or different from each other, are selected from the group consisting of $C_1$-$C_{20}$ alkyl, aryl or benzyl; and $R^4$ and $R^5$, equal or different from each other, are selected from the group consisting of $C_1$-$C_{20}$ alkyl, aryl, benzyl or moieties comprising ethylene and/or propylene oxide repeating units of formula $(CH_2CH_2O)_x(CH_2CHCH_3O)_yO$ wherein x and y are independently comprised between 0 and 30 and when x=0 then y≠0.

The phase transfer agent is preferably selected from the group consisting of the benzyltrimethylammonium halides, benzyltriethylammonium halides, methyltricaprylammonium halides, methyltributylammonium halides, methyltrioctylammonium halides, and cetyltrimethylammonium halides. Cetyltrimethylammonium halides are particularly preferred. Among the halides, chlorides and bromides are preferred.

The amount of phase transfer agent in the suspension is calculated based on the amount which is required to provide no more than 40% monolayer coverage of the silica particles. Advantageously, the amount of phase transfer agent in the suspension is sufficient to provide at least 10% monolayer coverage of the silica particles, preferably at least 12% coverage.

The amount of phase transfer agent providing 100% monolayer coverage of the silica particles can be calculated using models known to those skilled in the art. Notably the amount of phase transfer agent providing 100% coverage can be calculated taking into account a model silica suspension with particles having a 50 nm diameter and a silanol density of 6 OH/nm² and assuming that each silanol interacts with one molecule of phase transfer agent.

When the phase transfer agent is cetyltrimethylammonium bromide the amount providing from 10 to 40% of the monolayer coverage is typically from 3 to 25% by weight with respect to the weight of silica particles, advantageously from 5 to 15% by weight.

The suspension comprises a water-immiscibe polar organic liquid. The term "water-immiscible" is used herein to refer to compounds whose solubility in water at 20° C. is less than 25 g/100 g. The water-immiscible polar organic liquid is selected among those that will form a biphasic system with a water/alkyl alcohol silica suspension.

Notable non-limiting examples of suitable water-immiscible polar organic liquids are for instance 2-methyltetrahydrofuran and methyl ethyl ketone. Preferably the water-immiscible polar organic liquid is 2-methyltetrahydrofuran.

A further object of the invention is a process for the preparation of suspensions of silica particles in a polar water-immiscible organic liquid which comprises the following steps:
(i) mixing a solution of at least one phase transfer agent in a water-miscible organic liquid with a suspension in water of silica particles having an average particle size of less than 400 nm;
(ii) adding a water-immiscible polar organic liquid to the suspension obtained in step (i) to form a biphasic system comprising an aqueous phase and an organic phase containing the silica particles;
(iii) separating the aqueous phase from the organic phase containing the silica particles thus obtaining a suspension of silica particles in a water-immiscible polar organic liquid;
(iv) reacting the silica particles in the suspension obtained at the end of step (iii) with at least one compound of formula (I):

$$R\text{—}Si(OR^1)_3 \quad (I)$$

wherein R is —$CH_3$ or —CH=$CH_2$ and each $R^1$ is independently selected from the group consisting of —$CH_3$ or —$C_2H_5$ to obtain the inventive suspension of silica particles.

In step (i) of the process, a suspension in water of silica particles having an average particle size of less than 400 nm [suspension (S-W)] is mixed with a solution of a phase transfer agent in a water-miscible organic liquid.

Suspension (S-W) may comprise silica particles having an average particle size of less than 350 nm, preferably less than 300 nm. The average particle size is typically at least 5 nm. The average silica particle size may advantageously be in the range from 10 to 350 nm, preferably in the range from 20 to 300 nm, more preferably in the range from 20 to 250 nm. The average silica particle size may even be in the range from 20 to 200 nm.

Suspension (S-W) typically has a silica content in the range from 1 to 60% by weight, typically from 5 to 50% by weight. The silica content is preferably in the range from 5 to 40% by weight.

Suspension (S-W) may be a sol of colloidal silica particles in water. Such silica sols are known and may be prepared according to methods known in the art, such as for instance by acidification of the corresponding alkaline silica sols, by production from low molecular weight silicic acids, preferably water glass, or by condensation of esters of low molecular weight silicic acids.

In a preferred embodiment, suspension (S-W) is obtained from precipitated silica by means of a dispersion process. The precipitated silica, in powder, granule or any other solid form, may be suspended in water and then submitted to a dispersion process suitable to generate particles having an average particle size of less than 400 nm. Suitable processes are for instance high shear mixing, treatment with ultrasound and the like.

The inventive process thus may comprise an additional step of providing a suspension of precipitated silica in water and subjecting said precipitated silica to a dispersion treatment to obtain silica particles having an average particle size of less than 400 nm.

Alternatively, suspension (S-W) may be directly obtained from the process for the precipitation of silica. For instance, once precipitated silica is formed it may be filtered and washed and then re-dispersed in water to provide a suspension having the desired silica content. Several methods can be employed for the precipitation of silica: notably, the addition of an acidifying agent to a sediment of the silicate, or simultaneous addition, partial or total, of an acidifying agent and of the silicate to water or to a silicate sediment already present in the vessel.

Notable, non-limiting examples of processes for the preparation of precipitated silica are disclosed for instance in EP396450A, EP520862A, EP647591A, EP670813A, EP670814A, EP901986A, EP762992A, EP762993A, EP917519A, EP983966A, EP1355856A, WO03/016215, WO2009/112458, WO2011/117400.

Any type of precipitated silica may be used for the preparation of suspension (S-W). In an embodiment of the invention, the precipitated silica used in the preparation of suspension (S-W) is characterized by a BET surface area in the range from 80 to 300 m²/g. BET surface area is determined according to the Brunauer-Emmett-Teller method as detailed in standard NF ISO 5794-1, Appendix E (June 2010).

Mention may be made for instance of the following commercially available precipitated silicas: Zeosil® 1165MP, Zeosil® 1115MP, Zeosil® Premium 200MP, Zeosil® 1085GR, Tixosil® 365 (all commercially available from Solvay SA).

The precipitated silica may be in any physical form, such as powder, granules or, preferably, spherical beads. Typically, the mean average size of said beads is of at least 50 µm, preferably of at least 80 µm, especially at least 100 µm, for example at least 150 µm. The mean average size of the beads is generally not more than 300 µm or even not more than 270 µm. The mean size is determined according to standard NF X 11507 (December 1970) by dry sieving and determination of the diameter corresponding to a cumulative oversize of 50%.

Suspension (S-W) typically has a pH of at least 7, preferably of at least 8, and more preferably of between 8 and 10. The pH of suspension (S-W) is adjusted to the required value by addition of a base, typically an alkaline metal hydroxide, such as NaOH or KOH.

In step (i) of the process, suspension (S-W) is mixed with a solution of a phase transfer agent in a water-miscible organic liquid.

The water-miscible organic liquid is typically selected from the group consisting of the alkyl alcohols. It is preferably selected from the group consisting of methanol, ethanol or propanol.

Preferably, the phase transfer agent is more soluble in the organic phase than in the aqueous phase.

The amount of phase transfer agent mixed with suspension (S-W) is such that it provides the appropriate ratio of monolayer coverage, i.e. no more than 40% of monolayer coverage of the silica particles as defined above.

The suspension obtained at the end of step (i), comprising silica particles, water, the phase transfer agent and a water-miscible organic liquid is stirred.

Step (i) of the process is typically performed at room temperature and in any event at a temperature below the boiling temperature of the liquid phase.

In step (ii) of the process, a water-immiscible polar organic liquid is added to suspension (S-W) obtained at the end of step (i).

Suitable water-immiscible polar organic liquids are those defined above for the inventive silica suspension, notably 2-methyltetrahydrofuran and methyl ethyl ketone.

The water-immiscible polar organic liquid is typically added in an amount ranging from 0.5:1 to 2:1, even 0.8:1 to 2:1 by weight with respect to the weight of the suspension obtained in step (i). The addition is typically performed at room temperature.

After stirring, the system thus obtained is allowed to stand in order to promote the formation of a biphasic system comprising a first aqueous phase and a second organic phase containing the silica particles.

Said second organic phase comprises the water-immiscible polar organic liquid, the silica particles as well as the phase transfer agent.

The aqueous phase comprises typically only water and the alkyl alcohol used for the addition of the at least one phase transfer agent.

In step (iii) of the process the aqueous phase is separated from the organic phase containing the silica particles.

The suspension thus obtained [suspension (S-O)] comprises the water-immiscible polar organic liquid, the at least one phase transfer agent and silica particles having an average particle size of less than 400 nm. In step (iv) of the process, the silica particles in suspension (S-O) are reacted with a compound of formula (I) as defined above. The reaction is typically performed under heating, typically at the reflux temperature of the water-immiscible polar organic liquid.

The amount of compound of formula (I) added to the suspension in step (iv) may range from 1 to 100% by weight with respect to the weight of the silica particles, occasionally from 5 to 150% by weight.

At the end of step (iv) the inventive suspension of silica particles is recovered.

The inventive suspension may be used as a starting material for the preparation of numerous silica-filled compositions, in particular silica-filled polymer compositions.

A further object of the invention is thus a composition comprising the suspension of silica particles which is the first object of the invention.

In a preferred embodiment said composition comprises the inventive suspension and at least one polymer.

The at least one polymer can be selected among the thermosetting polymers and the thermoplastic polymers. Notable, non-limiting examples of thermosetting polymers include thermosetting resins such as epoxy resins, unsaturated polyester resins, vinyl ester resins, phenolic resins, epoxy acrylate resins, urethane acrylate resins, phenoxy resins, alkyd resins, urethane resins, maleimide resins, and cyanate resins.

Notable, non-limiting examples of suitable thermoplastic polymers include styrene-based polymers such as polystyrene, (meth)acrylic acid ester/styrene copolymers, acrylonitrile/styrene copolymers, styrene/maleic anhydride copolymers, ABS, ASA, and AES; vinylidene halide polymers, such as polyvinylidene fluoride and chloride; acrylic polymers such as polymethylmethacrylate; polycarbonates; polyamides; polyesters, such as polyethylene terephthalate and polybutylene terephthalate; polyphenylene ethers; polysulfones; polyaryletherketones; polyphenylene sulfides; thermoplastic polyurethanes; polyolefins such as polyethylene, polypropylene, polybutene, poly-4-methylpentene, ethylene/propylene copolymers, ethylene/α-olefins copolymers; copolymers of α-olefins and various monomers, such as ethylene/vinyl acetate copolymers, ethylene/(meth)acrylic acid ester copolymers, ethylene/maleic anhydride copolymers, ethylene/acrylic acid copolymers; aliphatic polyesters such as polylactic acid, polycaprolactone, and aliphatic glycol/aliphatic dicarboxylic acid copolymers.

The polymer may be either soluble or insoluble in the water-immiscible polar organic liquid of the inventive suspension.

The invention will be now described with reference to the following examples, whose purpose is merely illustrative and not intended to limit the scope of the invention.

EXAMPLES

Analytical Method

Average Particle Size Determination by Dynamic Light Scattering

Silica particle sizes were determined using a dynamic light scattering Malvern NanoZS apparatus. The measurements of silica particles in aqueous media were made using disposable plastic cuvettes whereas the measurements in organic media were made using plastic capped quartz cuvettes. The samples were diluted ten times before measurements. The readings were acquired 6 times with a waiting time of 30 s and a measurement angle of 173° backscattering. The refractive indexes used are: 1.52 for silica, 1.33 for water and 1.41 for 2-MeTHF. The results which are given correspond to median ($D_{50}$) of the number particle size distribution.

Example 1—General Procedure for the Preparation of Suspension (S-W)

3.2 g of silica Zeosil® 1165 MP were suspended in 40 mL of deionized water in a high shaped 50 mL beaker. The pH was adjusted to 9 using an aqueous solution of NaOH at a concentration of 0.5 M (~0.8 g).

The suspension was then treated with ultrasounds (1500 W generator type Sonics Vibracell VC1500/VCX1500 equipped with: Converters CV154+Boosters (Part No: BHNVC21)+19 mm Probe (Part No: 630-0208)) over a period of 8 min (600 W) while the beaker was kept in an ice bath to prevent the warm up of the solution. The pH was then adjusted to 9 once more after the ultrasound treatment (~0.4 g NaOH 0.5 M). The suspension was maintained under vigorous stirring (with magnetic stirrer) before performing step (ii) of the process. The $D_{50}$ of the particles in the suspension thus obtained was 150 nm.

Example 2—General Procedure for the Preparation of Suspension (S-O)

4 g of silica suspension (S-W) obtained in Example 1 was slowly added to a solution of cetyltrimethylammonium bromide in ethanol (21 mg of cetyltrimethylammonium bromide in 0.2 g of ethanol) in a 250 mL beaker. The solution was kept under vigorous stirring while 3.75 g of 2-methyltetrahydrofuran (2-MeTHF) was added. The biphasic solution was vigorously stirred at room temperature for one hour before being transferred to in a 250 mL separating funnel. The biphasic system was allowed to decant for one hour. The lower aqueous phase was then separated (3.7 g of water) providing a suspension, suspension (S-O), of silica particles in 2-MeTHF.

It was observed that in the absence of stirring the silica particles in suspension (S-O) slowly decanted out of the suspension over a period of 2 h forming a solid.

EXAMPLE 3—Preparation of Silica Suspension Wherein Compound of Formula (I) is $(CH_2=CH)Si(OCH_3)_3$ 5.4 g of a suspension (S-O) obtained following the procedure of Example 2 were transferred in a 50 mL three-necked round bottom flask. 22 mg of $(CH_2=CH)Si(OCH_3)_3$ were quickly added with a syringe to the silica suspension and reflux heated over 16 h. The resulting suspension was stable (meaning no sedimentation of the silica) for over one month with no further purification.

EXAMPLE 4—Preparation of Silica Suspension Wherein Compound of Formula (I) is $(CH_3)Si(OC_2H_5)_3$ 5.4 g of a suspension (S-O) obtained following the procedure of Example 2 were transferred in a 50 mL three-necked round bottom flask. 71.1 mg of $(CH_3)Si(OC_2H_5)_3$ were added with a syringe to suspension and reflux heated over 16 h. The resulting suspension was stable (meaning no sedimentation of the silica) for over one month with no further purification.

EXAMPLE 5—Preparation of Silica Suspension Wherein Compound of Formula (I) is $(CH_3)Si(OCH_3)_3$ 5.4 g of a suspension (S-O) obtained following the procedure of Example 2 were transferred in a 50 mL three-necked round bottom flask. 54 mg of $(CH_3)Si(OCH_3)_3$ were added with a syringe to the suspension and reflux heated over 16 h. The resulting suspension was stable (meaning no sedimentation of the silica) for over one month with no further purification.

EXAMPLE 6 (Comparative)—Preparation of Silica Suspension Using Compound of Formula $(C_2H_5)Si(OC_2H_5)_3$ or $(CH_3)_2Si(OC_2H_5)_2$ 5.4 g of a suspension (S-O) obtained following the procedure of Example 2 were transferred in a 50 mL three-necked round bottom flask. 47.2 mg of $(C_2H_5)Si(OCH_3)_3$ were added with a syringe to the suspension and reflux heated over 16 h. The resulting suspension was not stable and the solid decanted at the bottom of the container in less than 12 h.

EXAMPLE 7 (Comparative)—Preparation of Silica Suspension Using Compound of Formula $(CH_3)_2Si(OC_2H_5)_2$ 5.4 g of a suspension (S-O) obtained following the procedure of Example 2 were transferred in a 50 mL three-necked round bottom flask. 36.4 mg of $(CH_3)_2Si(OC_2H_5)_2$ were added with a syringe to the suspension and reflux heated over 16 h. The resulting suspension was not stable and the solid decanted at the bottom of the container in less than 12 h.

EXAMPLE 8—Polymer Composition Comprising Silica Particles 3 g of a vinylidene fluoride copolymer (Solef® 21510, Solvay SA) which was previously dried at 80° C. for 4 h in an oven were added to 15 g of acetone in a 200 mL three-necked round bottom flask equipped with a reflux condenser. The suspension was heated at 60° C. until complete dissolution of the polymer. 5.4 g of the suspension of Example 3 were added to the solution with the help of a syringe.

The solution was stirred for 30 min and then casted with a doctor blade at a wet thickness of 250 μm on a glass plate. The obtained film was peeled off and dried in an oven at 80° C. for 10 minutes to remove solvent residues. The film have a dry thickness of 36 μm+/−2 μm. Visual inspection showed a uniform distribution of the silica particles in the film.

The invention claimed is:

1. A process for the preparation of a suspension of silica particles
said suspension comprising a water-immiscible polar organic liquid, at least one phase transfer agent, and silica particles having an average particle size of less than 400 nm, characterized in the organosilane moieties derived from compounds of formula (I):

$$R—Si(OR^1)_3 \qquad (I),$$

wherein R is —CH₃ or CH=CH₂ and each R¹ is independently selected from the group consisting of —CH₃ or —C₂H₅, are chemically bound to the silica, said the process comprising:
(i) mixing a solution of the at least one phase transfer agent in a water-miscible organic liquid with a suspension in water of silica particles having an average particle size of less than 400 nm;
(ii) adding the water-immiscible polar organic liquid to the suspension obtained in step (i) to form a biphasic system comprising an aqueous phase and an organic phase containing the silica particles;
(iii) separating the aqueous phase from the organic phase containing the silica particles thus obtaining a suspension of silica particles in the water-immiscible polar organic liquid;
(iv) reacting the silica particles in the suspension obtained at the end of step (iii) with a compound selected from the group consisting of the compounds of formula (I) as previously defined.

2. The process of claim 1 wherein silica particles are particles of precipitated silica.

3. The process of claim 1 further comprising the step of providing a suspension of precipitated silica in water and subjecting said precipitated silica to a dispersion treatment to obtain silica particles having an average particle size of less than 400 nm.

4. The process of claim 3 wherein the precipitated silica is in the form of powder, granules or spherical beads.

5. The process of claim 1 wherein the water-miscible organic liquid is selected from the group consisting of alkyl alcohols.

6. The process of claim 1 wherein the water-immiscible polar organic liquid is 2-methyltetrahydrofuran or methyl ethyl ketone.

7. The process of claim 5 wherein the water-miscible organic liquid is selected from the group consisting of methanol, ethanol, and propanol.

8. The process of claim 1 wherein the at least one phase transfer agent is selected from the group consisting of quaternary ammonium salts of formula (1):

$$R^2R^3R^4R^5NX \qquad (1)$$

wherein: X is selected from the group consisting of halogens, $CH_3SO_4^-$ and $C_2H_5SO_4^-$;
$R^2$ and $R^3$, equal or different from each other, are selected from the group consisting of $C_1$-$C_{20}$ alkyl, aryl and benzyl; and $R^4$ and $R^5$, equal or different from each other, are selected from the group consisting of $C_1$-$C_{20}$ alkyl, aryl, benzyl and moieties comprising ethylene and/or propylene oxide repeating units of formula $(CH_2CH_2O)_x(CH_2CHCH_3Q)_yO$ wherein x and y are independently comprised between 0 and 30 and when x is zero then y does not equal zero.

9. The process of claim 1 wherein the at least one phase transfer agent is selected from the group consisting of the benzyltrimethylammonium halides, benzyltriethylammonium halides, methyltricaprylammonium halides, methyltributylammonium halides, methyltrioctylammonium halides, and cetyltrimethylammonium halides.

10. The process of claim 1 wherein the phase transfer agent is present in an amount providing no more than 40% monolayer coverage of the silica particles.

* * * * *